Sept. 12, 1939. P. CARLSON 2,172,831
TRUCK BODY
Filed May 3, 1938 4 Sheets-Sheet 1

INVENTOR
PHILIP CARLSON
BY
ATTORNEY

INVENTOR
PHILIP CARLSON
BY John J Hanrahan
ATTORNEY

Sept. 12, 1939.  P. CARLSON  2,172,831

TRUCK BODY

Filed May 3, 1938  4 Sheets—Sheet 3

INVENTOR
PHILIP CARLSON
BY
ATTORNEY

Sept. 12, 1939.  P. CARLSON  2,172,831
TRUCK BODY
Filed May 3, 1938  4 Sheets-Sheet 4
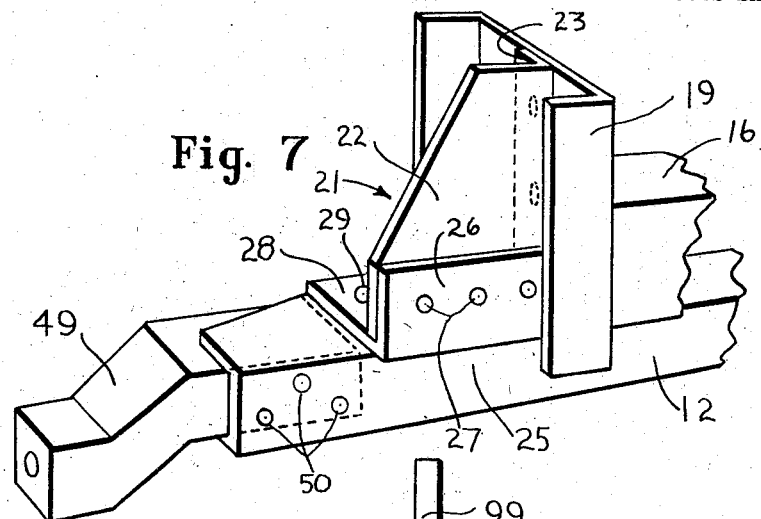
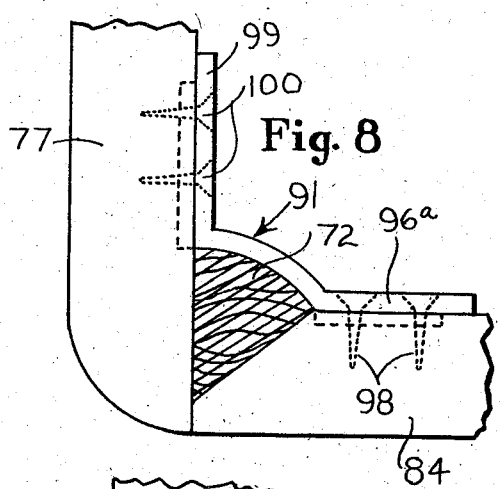
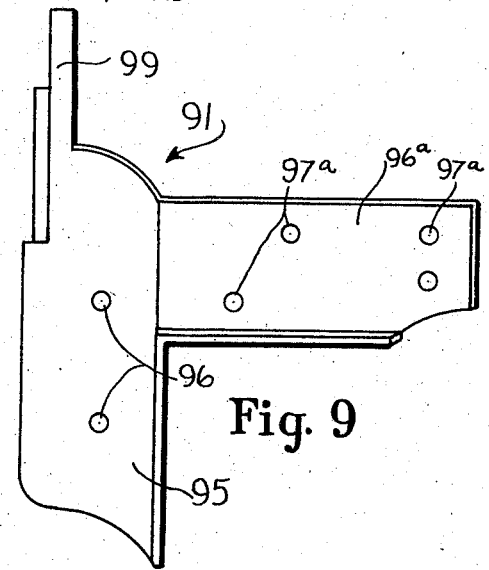
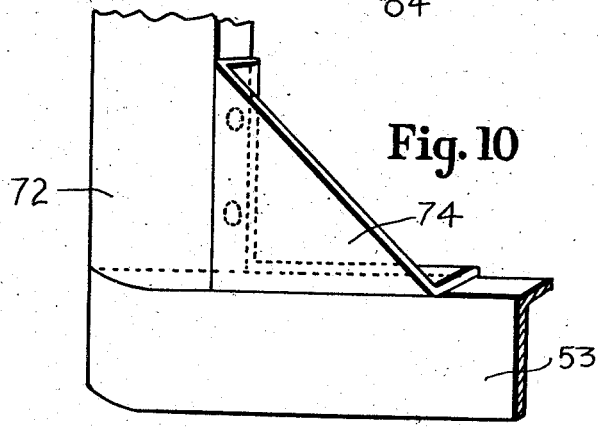
INVENTOR
PHILIP CARLSON
BY
ATTORNEY Patented Sept. 12, 1939

2,172,831

UNITED STATES PATENT OFFICE 2,172,831

TRUCK BODY

Philip Carlson, Long Hill, Conn.

Application May 3, 1938, Serial No. 205,667

9 Claims. (Cl. 296—28)

This invention relates to new and useful improvements in truck body construction and has particular relation to the construction of truck bodies of the type which overlie the truck wheels.

The invention provides a construction more especially designed for use in a body of the type indicated when applied to any or the usual construction of truck chassis, the invention being particularly useful in connection with so called conversion jobs although not necessarily limited to a conversion construction.

The objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 7 is a perspective view showing the connection between a vertical strengthening member and a chassis member;

Fig. 8 is a plan view showing an upper corner construction;

Fig. 9 shows the corner bracket alone; and

Fig. 10 is a perspective view showing a lower corner bracket construction.

The present invention has particularly to do with the providing of a strong yet flexible or yielding construction of truck body and includes means whereby in a conversion arrangement wherein a special body is mounted on a standard chassis the body and particularly the forward portion thereof, in a construction wherein the body overlies the vehicle wheels, is strengthened and fully supported. According to the present invention a body including a front portion extending above the front vehicle wheels and thus of appreciable greater weight in its forward portion than the usual constructions (wherein the forward portion of the chassis in addition to the engine supports only the engine hood and the radiator) is provided. With the construction herein set forth the mentioned additional weight is properly supported and distributed.

Figure 6:
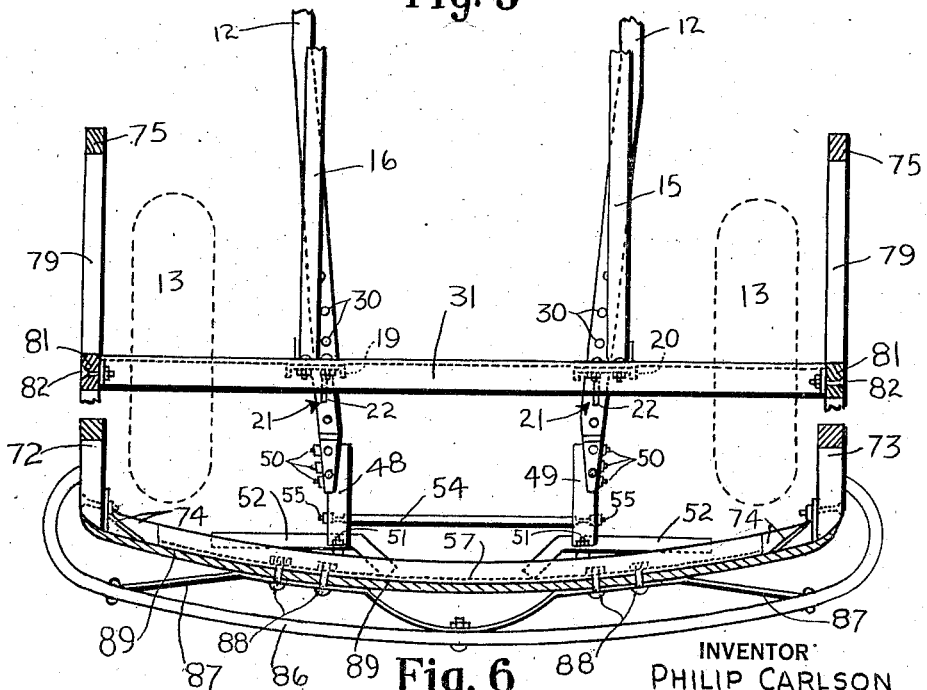
Fig. 6 is a sectional view as along the line 6—6 of Fig. 4.

Referring in detail to the drawings at 10 is shown a vehicle including a chassis 11 comprising side frame members 12 and any or the usual ground engaging wheels 13. Chassis 11 may be of the usual standard construction and its side frame members 12 may have their forward end portions inclined toward one another as shown best in Fig. 6. On the forward portion of the chassis is mounted a sub-frame generally designated 14 and shown complete in Fig. 3 and including relatively deep side members 15 and 16 arranged in parallel relation and connected at their rear or inner ends by a cross bar 17.

At their forward ends the members 15 and 16 are connected as by means of bolts 18 to vertical members 19 and 20 respectively. To provide a means whereby the bolts 18 may attach the frame members 15 and 16 to the vertical members 20 and 19, plates 18a are welded or otherwise secured to said members 15 and 16 and each includes a portion 18b extending across the end of its frame member and it is such portions 18b through which the bolts 18 pass. Vertical members 19 and 20 are in the form of shallow channel irons and secured to the connecting or web portion of each of said members are vertical braces 21 each including a forwardly projecting rib 22 and a portion or arm 23 secured to the web of the adjacent channel member by bolts, rivets, etc. 24.

Attaching pieces 25 have vertical flange portions 26 secured to the lower ends of the ribs 22 by bolts or the like 27 and the lower or horizontal arms 28 of such pieces are bolted or otherwise secured to the forward portions of the chassis frame members 12 as at 29. Bolts 30 passing through the lower arms of the channel shaped side members 15 and 16 secured the same to the chassis frame members 12 whereby the entire sub-frame 14 is secured to the vehicle chassis.

A bar 31, sectionally in the form of an inverted L, is attached to the upper ends of the vertical members 19 and 20 and extends beyond the outer side of each of them. Such bar at its ends carries vertically extending portions 32 and 33 respectively for attachment to other body frame members as will appear. Mounted on the forward portion of sub-frame member 15 is a wedge shaped member 34 for the support of a floor board as will presently appear.

Figure 3:
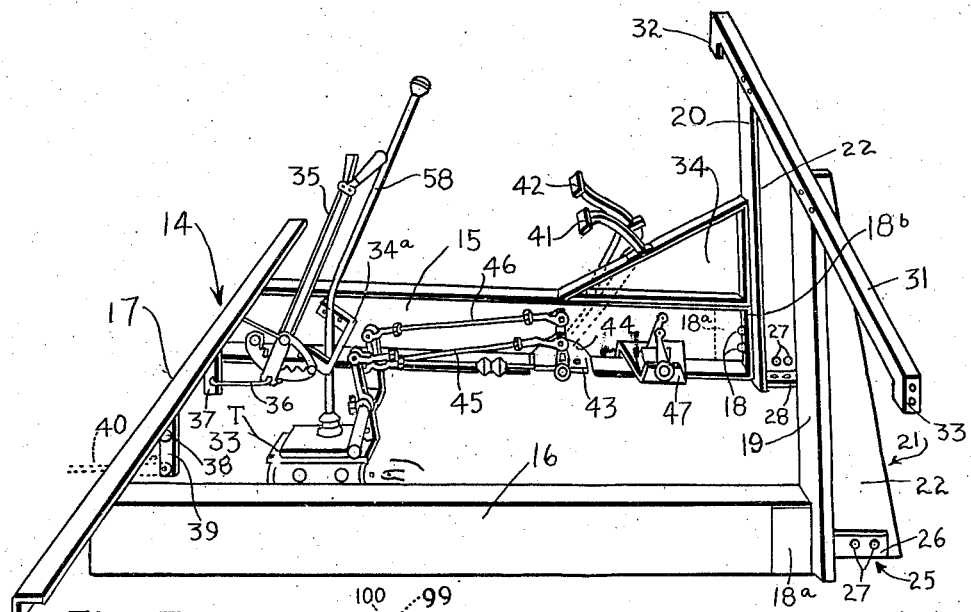
Fig. 3 is a perspective view showing a mounting or sub-frame employed.

Sub-frame 14 when in place on the vehicle chassis is about the vehicle engine (not shown) and the usual transmission I (see Fig. 3). Such sub-frame mounts a bracket 34a supporting the parking brake lever and adjacent parts 35. The lower end of such lever is connected by a link 36 with an arm 37 fixed to a shaft mounted by the bar 17. Also fixed to said shaft 38 is an arm 39 which by means of a link 40 is attached to operate the usual vehicle brake means (not shown). From the above it will be seen that the parking brake lever and certain of its connections are all mounted on the sub-frame 14 to form a unit therewith.

The usual brake and clutch pedals 41 and 42 are mounted by a bracket 43 to be attached to the chassis frame member 12 and for the accommodation of such bracket the sub-frame member 15 is notched or cut away at 44. At the inner side of the sub-frame side member 15 the parts directly operated by the brake and clutch pedal (and which parts extend through and are mounted by the bracket 43) are connected with links 45 and 46 connected to operate the usual vehicle brake and clutch means (not shown). A bracket 47 for the mounting of accelerator operating or control means is shown as mounted on the sub-frame side member 15.

A pair of goose-necks 48 and 49 have their rear or inner portions in the forward end portions of the chassis frame members 12 and are secured in place as by bolts or the like 50. Bolts 51 secure the forward ends of the goose-necks to attaching members 52 which as shown are of inverted L-shape when viewed in transverse section and are welded or otherwise secured to a cross member or bar 53 of channel formation. To add rigidity a brace or connecting bar 54 extends between the intermediate portions of the goose-necks and has inner and outer nuts or the like 55 clamping against the inner and outer sides of the goose-necks whereby the ends of the brace are fixed with respect to the goose-necks.

When the parts thus far described are assembled as described, floor boards may be placed in position and secured in any desired manner. Usually the floor boards are secured in place by bolts or the like and the floor section 57 has opening for the passage of the parking brake lever 35 and the gear shift lever 58. Also such floor section may include a removable portion 59 giving access to a battery housing 60. Floor section 61 together with section 62 has opening for the passage of the foot brake lever 41 and the clutch pedal 42 and the accelerator pedal 63 and an opening to accommodate the steering column 64 is provided. A hood 65 encloses the vehicle engine and the edge portions of floor sections 61 and 62 adjacent such hood are supported on the wedge-shaped member 34 above described.

Figure 4:
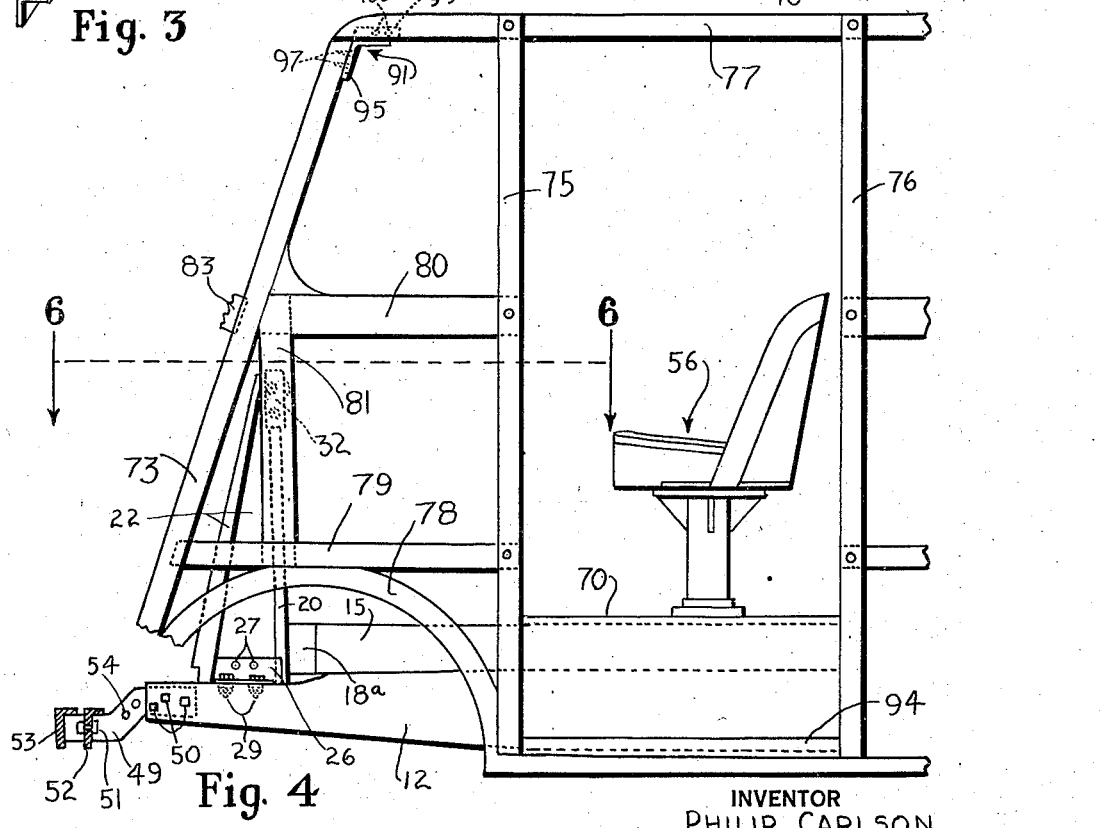
Fig. 4 is a side elevational view of the forward portion of the truck body the covering or side panels being omitted.
Figure 5:
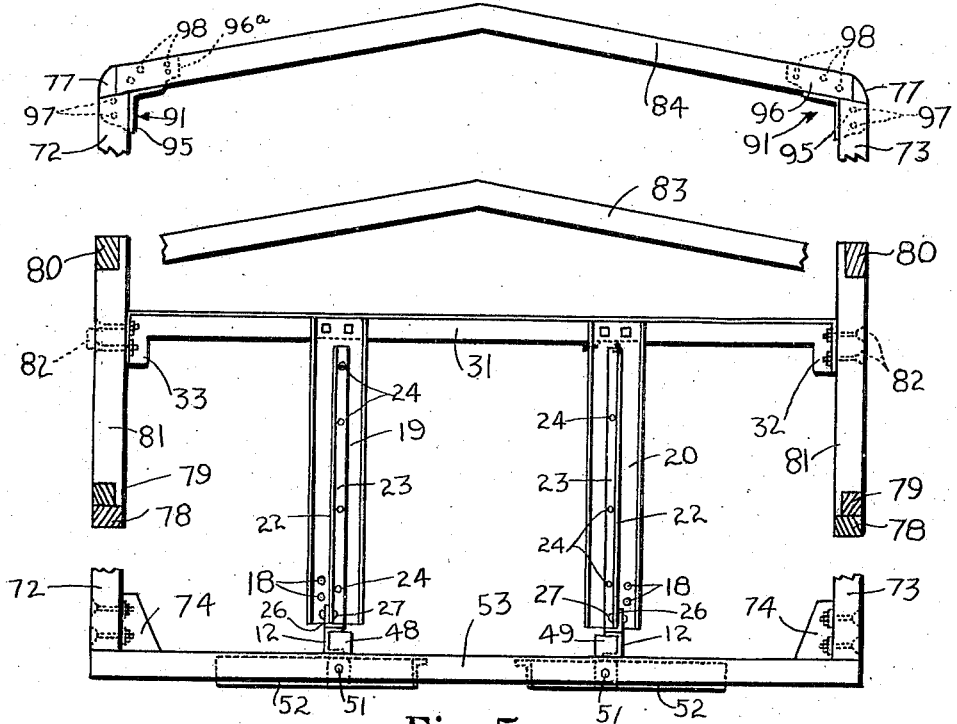
Fig. 5 is a front view of the construction of Fig. 4 certain parts being broken away.

Closing the space above the floor section 62 is a panel 66 the upper edge of which may be attached to the cross bar 31. Such panel together with the bar 31 supports a housing 67 for the various instruments usually found on the dash of an automobile and the faces of which are shown at 68 in a panel 69. Immediately beneath a floor section 70 is a platform 71 welded or otherwise secured to the side member 15 of the sub-frame 14 and forming a base or mounting for a driver's seat 56 (Fig. 4.)

With the flooring in place the body frame may be assembled. Here we are interested only in the forward portion of the body and the same at its forward corners includes upwardly inclining members 72 and 73 attached at their lower ends to the cross metal members 53 by brackets 74 bolted to the uprights and bolted or welded to the cross member. Vertical side members in the form of door posts 75 and 76 are shown and such members together with the members 72 and 73 support a pair of top members 77 arranged one at each side of the body.

Figures 1, 2:
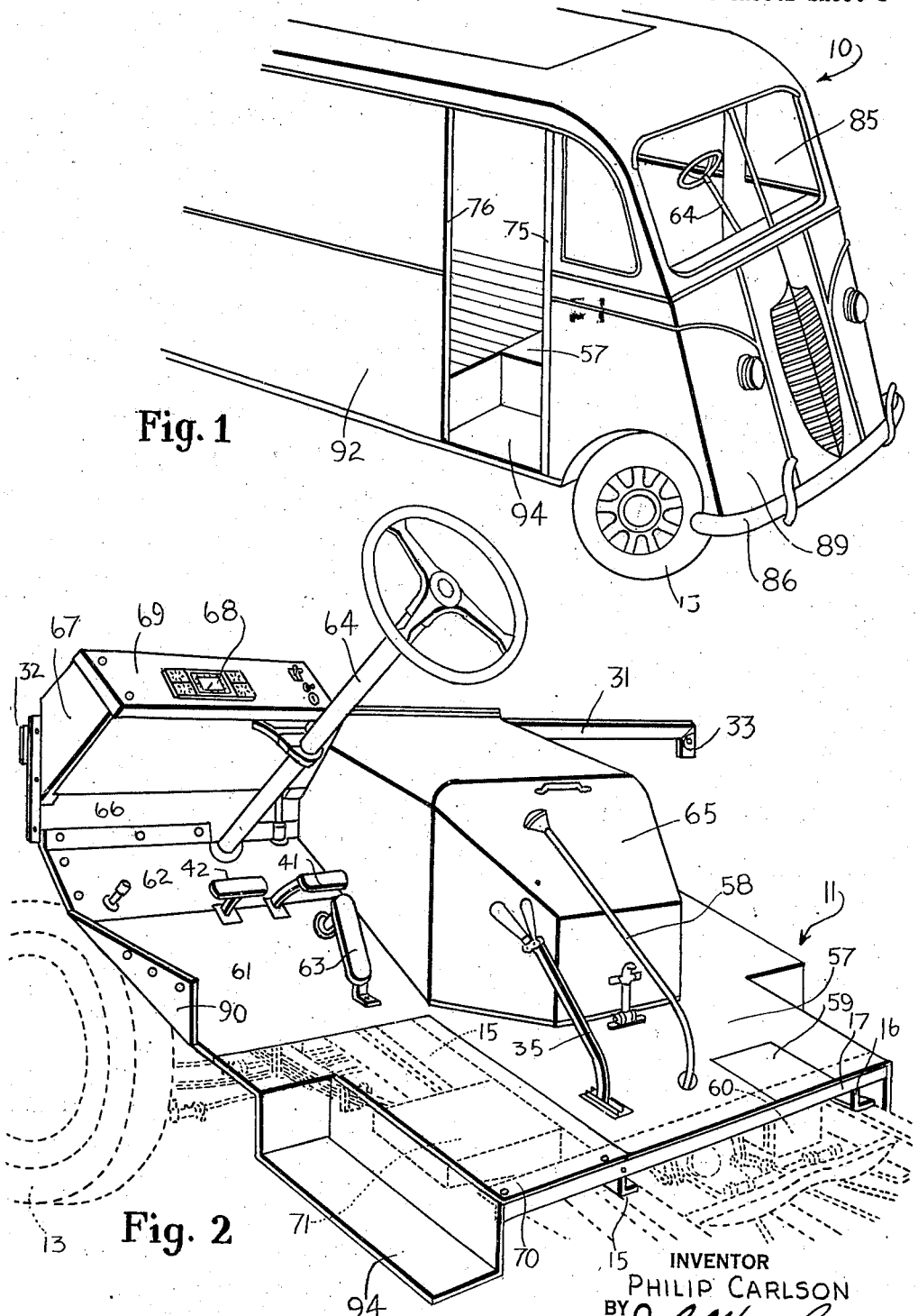
Fig. 1 is a perspective view of the front end portion of a truck the body of which is constructed in accordance with the invention.
Fig. 2 is a perspective view showing certain interior construction.

Accurate braces of wood 78 are provided at each side of the body while above such braces 78 other braces 79 and 80 connect posts 75 with the respective front corner posts 72 and 73. A vertical brace member 81 connects the braces 79 and 80 intermediate their ends. The downturned end portions 32 and 33 of the cross bar 31 are bolted to the vertical brace members 81 at the respective side of the vehicle body, as by bolts 82. The upper portions of the front corner posts 72 and 73 are connected by braces 83 and 84 located respectively below and above the windshield 85 shown in Fig. 1.

The sub-frame 14 raises the floor level of the vehicle so as to have it above the wheels thereof whereby the vehicle body projects laterally above the vehicle wheels. Also the sub-frame and particularly the forward portion thereof, including the vertical members 19 and 20 and associated parts, form a bridge-like construction of metal extending upwardly into the body whereby the same is strengthened and braced at a point intermediate the upper and lower portions thereof or at a point spaced above the chassis of the vehicle. This metal construction is not absolutely rigid but allows for certain give to take care of chassis distortion as the vehicle travels over uneven surfaces.

Cross bar 53 being connected with the vehicle chassis in the manner disclosed serves to assist in the supporting of the forward portion of the body attention being directed to the fact that in a so called conversion job a weight much greater than usual is placed on the forward portion of the vehicle chassis. The cross bar serves to connect and support the lower ends of the corner posts 72 and 73 and in addition it is to this bar that the vehicle front bumper 86 is attached as by brackets 87 bolted to the bar 53 at 88, the bolts passing through the front frame covering panels 89 of the body.

Floor section 61 includes an upturned edge portion 90 to be bolted to the brace 79 above described. Metal braces or brackets 91 (see Figs. 8 and 9) are secured to the top members 77, the top cross brace 84 and the front corner posts 72 and 73 at the junctures of said parts. The brackets may be secured to the mentioned parts as by means of screws, bolts or other fastening means 92. After the frame of the body is constructed or assembled as described it is covered by panels 89 at the front and by other panels 92 at the sides whereby the entire body is enclosed. The covering panels may be of metal or wood or of a laminated construction including both metal and wood or the like as desired.

As the sub-frame 14 raises the heighth of the floor above the ground, a step construction 94 is provided at each side of the vehicle. Such step as shown is below the level of the floor plate 70 on which the driver's seat directly rests. With this construction it is but an easy step from the ground on to the step 94 and then a second easy step on to the floor plate 70. As the step 94 is quite low and is yet within the vehicle, it will be apparent that the heighth of the door opening is very considerable so that it is not necessary for the driver to stoop when entering or leaving the vehicle.

Bracket 91 comprises a vertical portion 95 having openings 96 through which screws 97 are passed to secure such portion 95 to vertical member 72 or 73 and the bracket includes a wing 96 having openings 97 for the passage of the screws 98 and further includes a wing 99 secured to a top side rail 77 by screws 100. From this it will be seen that the upper front corners of the body are strongly braced since the three frame members meeting at such corners are securely tied together by the metal bracket 91.

Having thus set forth the nature of my invention, what I claim is:

1. In a motor vehicle including chassis side frame members and ground engaging wheels, a sub-frame on the forward portion of said chassis and secured thereto and comprising horizontal side members and vertical front end members, a box-like body on said chassis and of a width and length to overlie the front ground engaging wheels thereof, said body including side frame members located intermediate the top thereof and the lower edge thereof, and a transverse brace secured to the upper portions of said front members and at its ends secured to said side frame members.

2. In a motor vehicle including chassis side frame members and ground engaging wheels, a sub-frame on the forward portion of said chassis and including vertically disposed braces secured one to the forward portion of each of said side frame members and extending upwardly therefrom, a box-like body on said chassis and of a width and length to overlie the front wheels thereof, said body including side frame members located intermediate the top thereof and the lower edge thereof, and a transverse brace secured to the upper portions of said vertical members and at its ends secured to said side frame members.

3. In a motor vehicle including side frame chassis members and ground engaging wheels, vertically disposed braces secured one to the forward portion of each of said side frame members and extending upwardly therefrom, each of said braces including a plate-like portion extending transversely of the side frame members and web portions extending in the direction of the length of and secured to said side frame members, a body on said chassis and including side frame members located intermediate the top thereof and the lower edge thereof and laterally of said vertical braces, and a transverse brace member secured to the upper portions of the vertical brace members and extending laterally beyond the same, and means securing the ends of said transverse brace to said side frame members of the body.

4. In a motor vehicle including side frame chassis members and ground engaging wheels, vertically disposed metal braces secured to the forward portion of said side frame chassis members and extending upwardly therefrom, a body on said chassis and including side frame members located intermediate the upper and lower edges thereof and laterally of said vertical metal braces, and a transverse metal brace member secured to the upper portions of said vertical brace members and extending laterally beyond the same, and means securing the ends of said transverse metal brace to the side frame members of the body.

5. In a motor vehicle including chassis side frame members and ground engaging wheels, a sub-frame on and secured to the forward portion of said chassis, said sub-frame including horizontal channel iron members extending longitudinally of said side frame members, an angle iron extending transversely of the chassis and secured to the rear ends of said channel iron members, a pair of vertical metal members at the front ends of said channel iron members and secured at their lower ends to the side frame members of the chassis and to said channel iron members, a box-like body on said chassis and of a length and width overlying the front ground engaging wheels of the chassis, said body including side frame members intermediate its upper and lower edge and laterally of said vertical members, and a transverse angle iron brace secured to the upper portions of said front vertical members and at its ends to the side frame members of the vehicle body.

6. In a motor vehicle comprising a chassis including side frame members and ground engaging wheels, a sub-frame on the forward portion of said chassis and secured thereto and comprising horizontal side frame members and vertical front members, a box-like body on said chassis and of a width and length to overlie the front ground engaging wheels thereof, said body including side frame members located intermediate the top and lower edges thereof, a transverse brace secured to the upper portions of the front vertical members and extending laterally beyond the same, means securing the ends of said brace to the side frame members of the body, and flooring supported on the horizontal members of said sub-frame.

7. In a motor vehicle including chassis side frame members and ground engaging wheels, a box-like body on said chassis and extending beyond the front end thereof, extensions secured to the front end portions of said side frame members and extending beyond the latter, a cross bar secured to the forward ends of said extensions, and means securing the lower edge portion of the front to the body to said cross bar.

8. In a motor vehicle including a chassis comprising side frame members and ground engaging wheels, a box-like body on said chassis and extending beyond the front end thereof, extensions secured to the front end portions of said side frame members and extending beyond the latter, a cross bar secured to the forward ends of said extensions, means securing the lower edge portion of the front of the body to said cross bar, a bumper at the front of said body, and means securing the bumper to said cross bar.

9. In a motor vehicle including a chassis comprising side frame members and ground engaging wheels, a box-like body on said chassis and extending beyond the front end of the latter, extensions secured to the front end portions of said side frame members and extending beyond the latter, a cross bar secured to the forward ends of said extensions, said body comprising side frame members including front corner posts, means securing the lower end portions of said corner posts to said cross bar, and means securing the lower edge portion of the front of the body to said cross bar.

PHILIP CARLSON.